Aug. 22, 1961  H. E. ERICKSON ET AL  2,997,080
MAT HANDLING APPARATUS

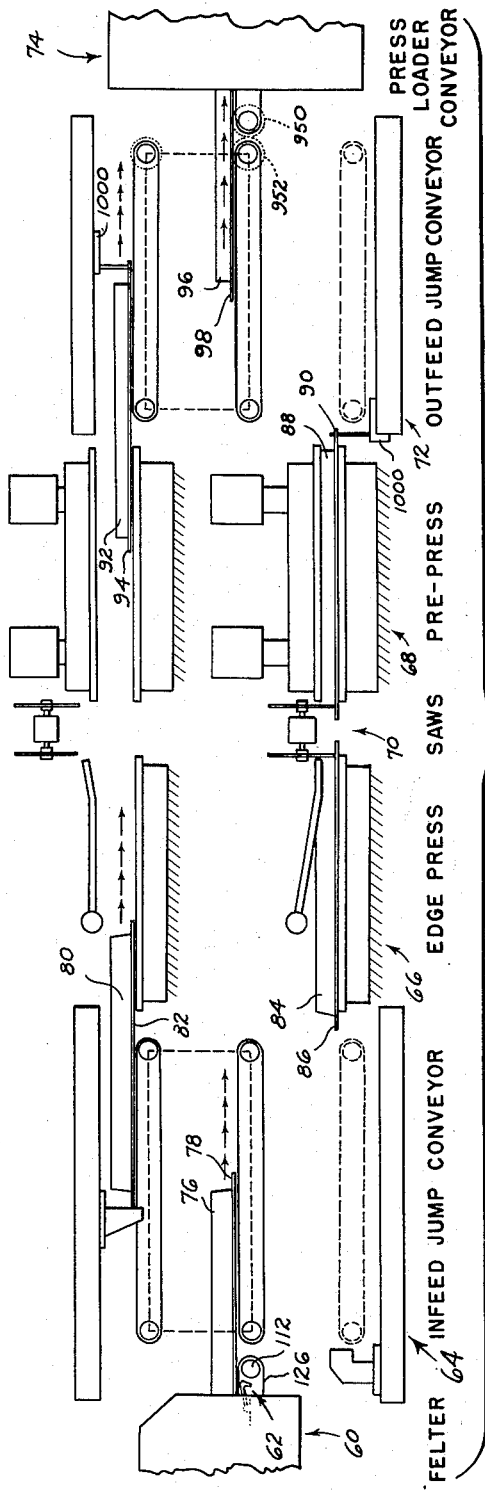

Original Filed March 21, 1957  4 Sheets-Sheet 2

INVENTORS
HAROLD E. ERICKSON
NORMAN E. NELSON
BY CHARLES V. NELSON
DALE L. SCHUBERT

Eugene L. Farley
ATTY.

INVENTORS
HAROLD E. ERICKSON
NORMAN E. NELSON
CHARLES V. NELSON
DALE L. SCHUBERT
BY Eugene L. Farley
ATT'Y.

Aug. 22, 1961     H. E. ERICKSON ET AL     2,997,080
MAT HANDLING APPARATUS

Original Filed March 21, 1957     4 Sheets-Sheet 4

*INVENTORS*
HAROLD E. ERICKSON
NORMAN E. NELSON
BY CHARLES V. NELSON
DALE L. SCHUBERT

*Eugene D. Farley*
ATTY.

United States Patent Office 2,997,080
Patented Aug. 22, 1961

2,997,080
MAT HANDLING APPARATUS
Harold E. Erickson, Auburn, and Norman E. Nelson, Charles V. Nelson, and Dale L. Schubert, Tacoma, Wash.; said Erickson assignor to said Schubert and said Norman E. Nelson and said Charles V. Nelson assignors, by mesne assignments, to Industrial Development Co., Tacoma, Wash., a corporation of Washington
Original application Mar. 21, 1957, Ser. No. 647,589. Divided and this application Sept. 2, 1958, Ser. No. 758,355
6 Claims. (Cl. 143—47)

This invention relates to mat handling apparatus. It pertains particularly to apparatus for handling compactable mats composed of small pieces of lignocellulose.

In the manufacture of hardboard and other composition board products, lignocellulose particles are first mixed with adhesive and formed into mats by suitable felting apparatus. For convenience in handling as well as for application in a subsequent hot pressing operation, the mats are formed directly upon, or are transferred to, metal caul plates of suitable dimensions. The caul plates and superimposed mats then are conveyed to a press loader which loads them into a multi-opening hot press. There the mats are pressed to the desired density.

Several serious difficulties are inherent in the foregoing sequence of operations. In the first place, the edges of the mats should be kept uniform so that the edges of the final consolidated products also will be uniform. This is difficult of accomplishment, however, since the mats are several inches thick and composed of loosely piled particles which may break away as the mats are being conveyed to the press.

One widely practiced solution to this difficulty has been to make oversize boards which are trimmed to the stipulated dimensions. Such a procedure is wasteful, however, for the reason that the trim which comprises from 5 to 10% of the lignocellulose starting material, having been consolidated under the combined influence of heat and pressure, can not be recycled to the production of a further quantity of composition board and conventionally is burned. This obviously causes a significant operating loss.

It also has been proposed that the handling of the mats between the felter and press may be facilitated by prepressing them to a coherent, self-sustaining form. It then is possible to move them into the press loader, and thence into the press, without substantial loss of the particles of which they are formed.

This procedure is subject to the disadvantage, however, that even though the mats are prepressed, the edges of the consolidated boards made from them are still irregular and must be trimmed with attendant loss of material. Also, it is difficult to introduce the incoherent, loose mats into a prepress without some of the component particles working their way beneath the caul plates. Then when pressure is applied to the caul plates are dented and eventually made unfit for use.

Still another difficulty inherent in the formation of fibrous mats and their conversion into consolidated products resides in the fact that prepressing operations such as are outlined above are time consuming and as a consequence it is not possible to employ a felter of high capacity to full advantage in a progressively moving plant production line.

Accordingly it is the general purpose of the present invention to provide apparatus for handling mats of varying dimensions, the application of which results in the production of prepressed mats having square, uniform edges at a rate sufficiently high to keep pace with a high capacity felter. The mats thus produced then are suitable for loading rapidly into a press loader and thence into a hot press for consolidation into boards having edges of uniform density which require little trimming. In this manner a very substantial loss of material is virtually eliminated.

The manner in which the foregoing and other objects of this invention are accomplished will be apparent from the accompanying specification and claims considered together with the drawings wherein:

FIG. 1 is a schematic view illustrating the various apparatus units employed in carrying out the herein described mat handling method;

Figure 6:
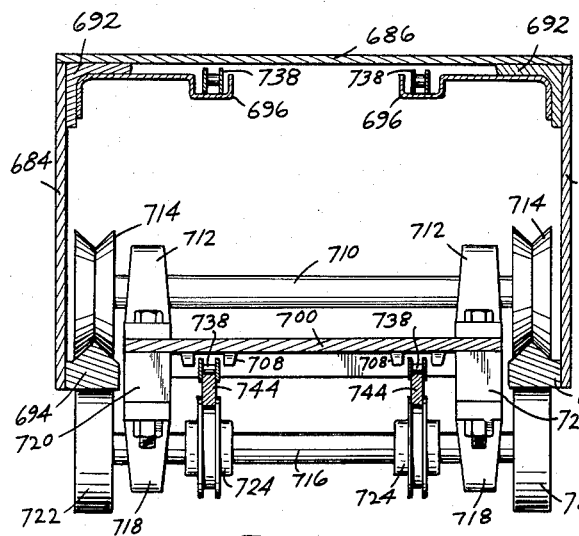
Figure 7:
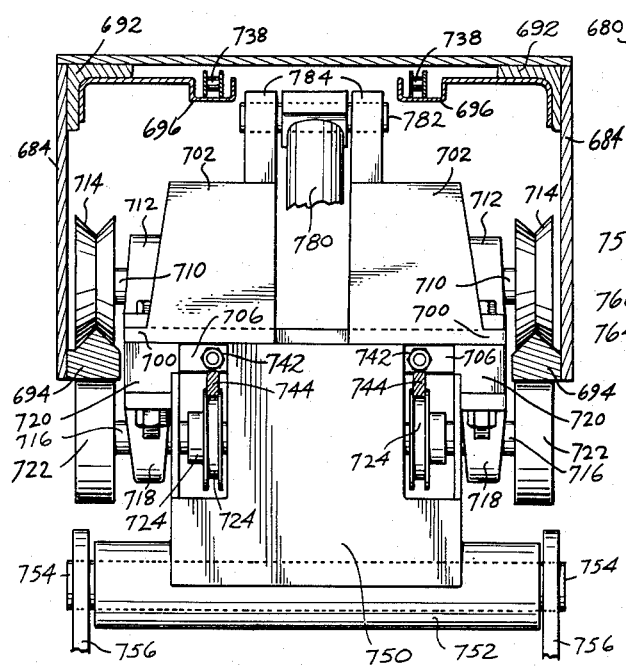
Figure 3:
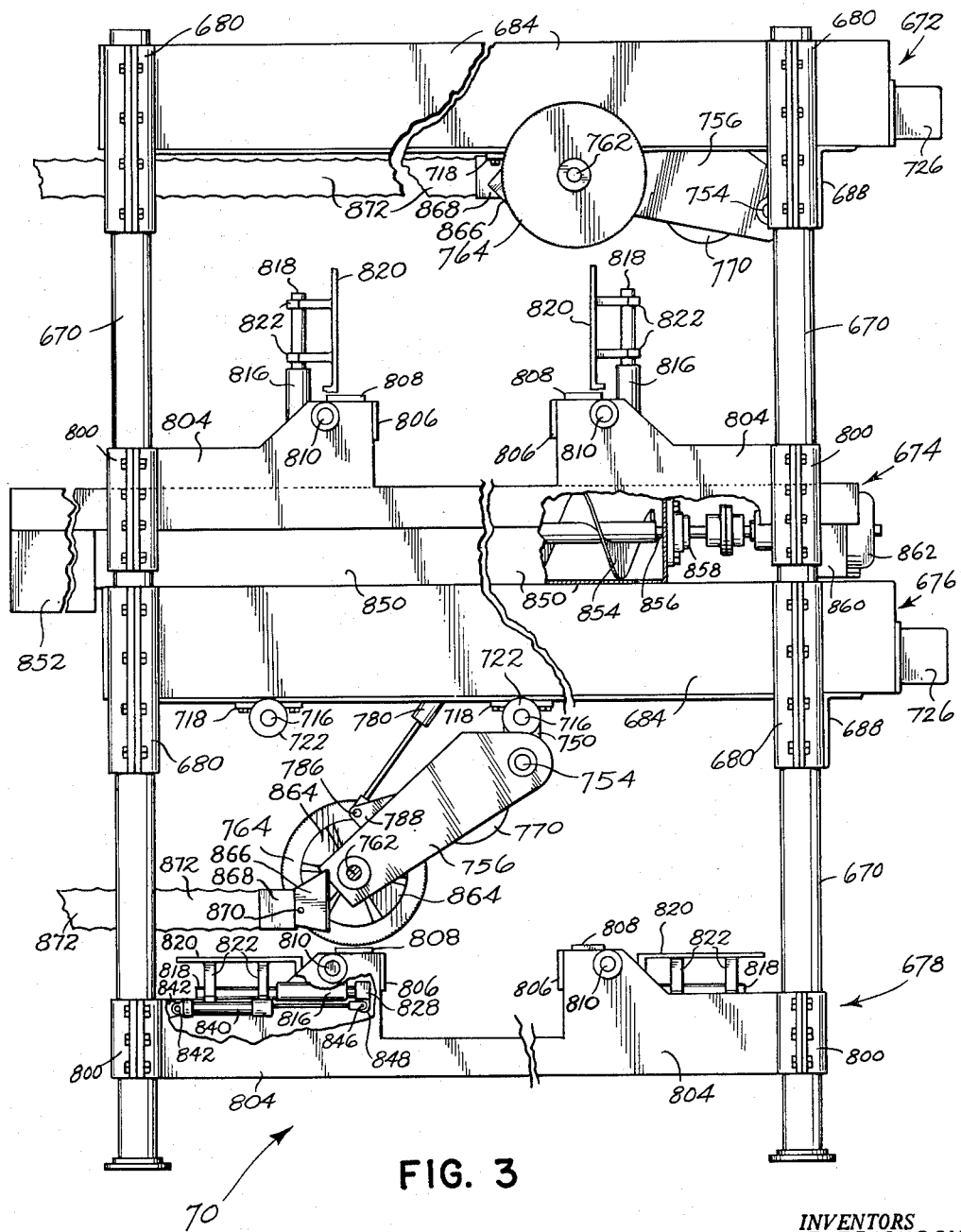
FIG. 3 is a view in end elevation of the trim saw of FIG. 2.
Figure 4:
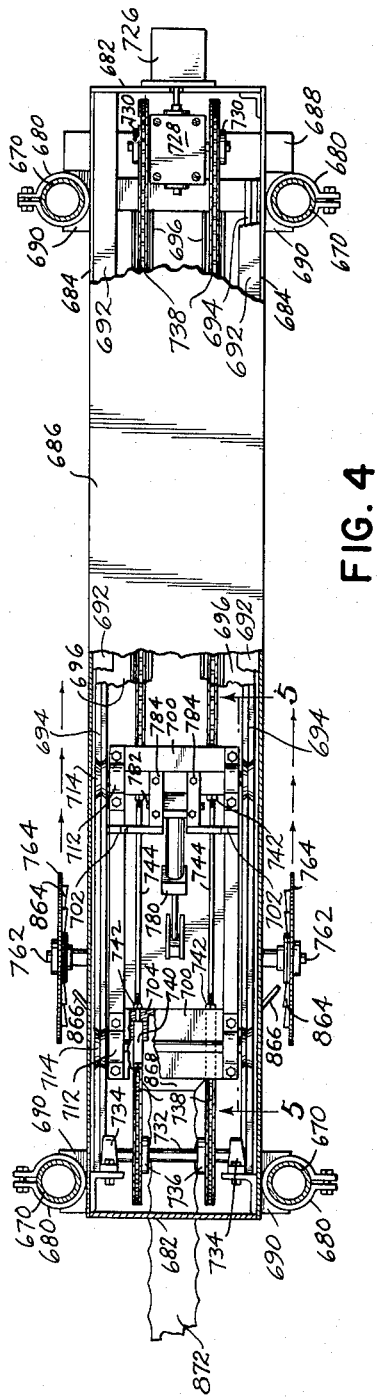
FIG. 4 is a detail plan view, partly in section, of the trim saw of FIGS 2 and 3.
Figure 5:
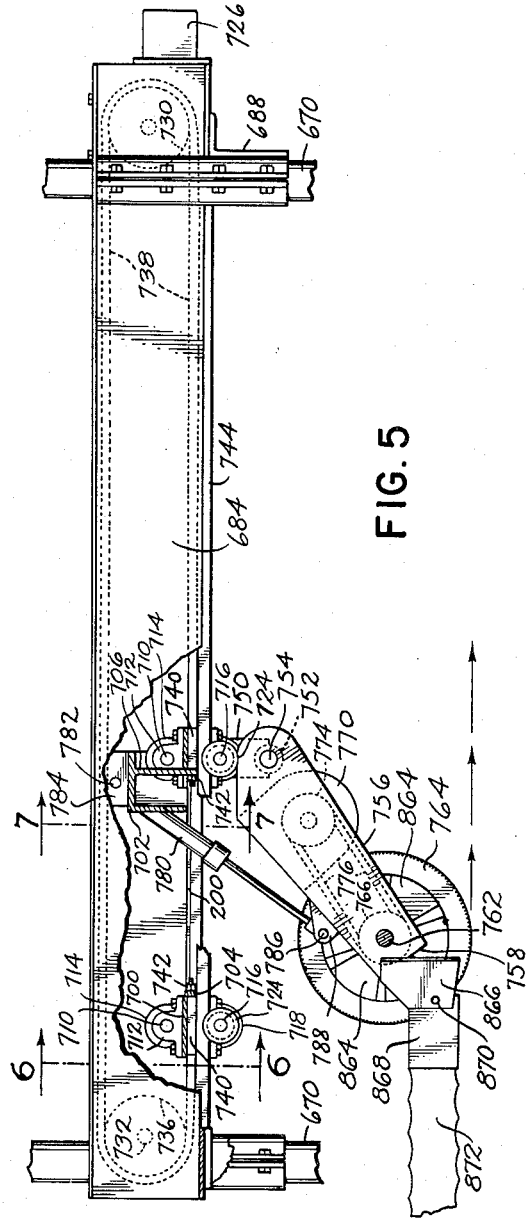
FIG. 5 is a detail view in end elevation of the trim saw of FIGS. 2–4, partly in section, along line 5—5 of FIG. 4.

FIGS. 6 and 7 (Sheet 2) are detail sectional views taken along lines 6—6 and 7—7 of FIG. 5 and illustrating the construction of a trolley assembly employed in the trim saw unit of FIGS. 2–5;

FIG. 8 (Sheet 1) is a detail view in side elevation of a deckle assembly employed in the trim saw unit of FIGS. 2–7; and FIG. 9 is a detail sectional view taken along line 9—9 of FIG. 8;

Generally stated, the presently described mat handling method comprises arranging in a line a plurality of longitudinally spaced apart, compactable mats, moving the mats linearly to a succession of stations, compacting the leading portion of a leading mat at a first station compacting the remainder of the leading mat at a second station, and compacting the leading portion of the next succeeding mat at the first station. The trailing end of the leading mat and the leading end of the next succeeding mat are trimmed off while maintaining both mats under compacting pressure. The pressure then is released and the leading mat advanced to a subsequent station for further processing, while the next succeeding mat is advanced to the second station for further compacting. This sequence is repeated as the remaining mats are moved into the described first and second stations.

The foregoing method results in the formation of prepressed mats having trimmed leading and trailing edges. The side edges may be maintained square and uniform by retaining them between deckle plates or otherwise during the compacting operation. Also, the mat line may be divided into two lines each traveling at an over-all reduced rate to make possible the compacting of the mat output of a high capacity felter.

Considering the foregoing in greater detail and with particular reference to the drawings:

The various operational units employed in carrying out the herein described invention are illustrated schematically in FIG. 1. A felter indicated generally at 60 deposits pieces of lignocellulose or other material on metal caul plates until they are built up into mats of suitable thickness. These mats are conveyed successively out of the felter on a suitable conveyor at a relatively rapid rate. As they reach the outfeed end of the conveyor they are impelled forwardly by impelling apparatus 62 until they are located precisely on an infeed jump conveyor 64.

The jump conveyor has the function indicated above of dividing the rapidly moving mat production line into two lines which move at relatively reduced over-all rates. The mats in these two lines then are transferred to a double edge press 66 having for its function the prepressing of the leading edges of the mats so that they may be guided into a double prepress unit 68. The latter unit prepresses or compacts the remaining area of each mat to the desired thickness.

While adjacent mats are being prepressed in units 66, 68 they are acted upon by traveling saws 70 which trim and square off the trailing edge of the leading mat and the leading edge of the following mat. During these operations the side edges of the mats may be retained between side deckles, not illustrated in FIG. 1 but to be described in connection with subsequent figures.

After the mats have been prepressed and trimmed, they are transferred to a second jump conveyor 72 which receives mats alternately from the upper and lower units of prepress 68 and loads them into a press loader conveyor 74. This carries them to an injector which, in turn, delivers them to the loader of a hot press of suitable design where they are consolidated to the desired density and thickness.

Thus in the schematic illustration of FIG. 1 there are depicted a number of work units in various stages of processing. The work unit comprising mat 76 on caul plate 78 is just leaving felter 60 and entering the lower unit of jump conveyor 64. Mat 80 on caul plate 82 is being transferred from the upper unit of conveyor 60 to the upper unit of edge press 66.

Mat 84 on caul plate 86 is depicted in the process of having its leading edge prepressed in the lower unit of edge press 66. Mat 88 on caul plate 90 is illustrated in position in prepress 68. The trailing edge of mat 88 and the leading edge of mat 84 are being trimmed off by the lower unit of cut-off saws 70. While this is occurring mat 92 on caul plate 94 is being transferred from the upper unit of prepress 68 to the upper unit of jump conveyor 72. Finally, mat 96 on caul plate 98 is being transferred from the lower unit of jump conveyor 72 into press loader conveyor 74.

*The trim saw unit*

As has been indicated above, while the leading mat is confined in prepress 68 and the trailing mat in edge press 66, the trailing edge of the former and the leading edge of the latter may be squared off and trimmed by suitable apparatus. Such apparatus comprises a traveling saw assembly indicated generally at 70 in FIG. 1 and illustrated in detail in FIGS. 2–9 inclusive.

Like the edge press and prepress, the saw assembly includes cooperating upper and lower decks. Each deck includes a track mounted across the work, a trolley mounted for reciprocation on the track, and spaced saws mounted on the trolley. Drive means are provided for reciprocating the trolley on the track as well as for lowering the saws into operative position and raising them into inoperative position. Deckle plates provided with means for both elevating them and retracting them confine the side edges of the work as it traverses the trim saw unit.

Figure 2:
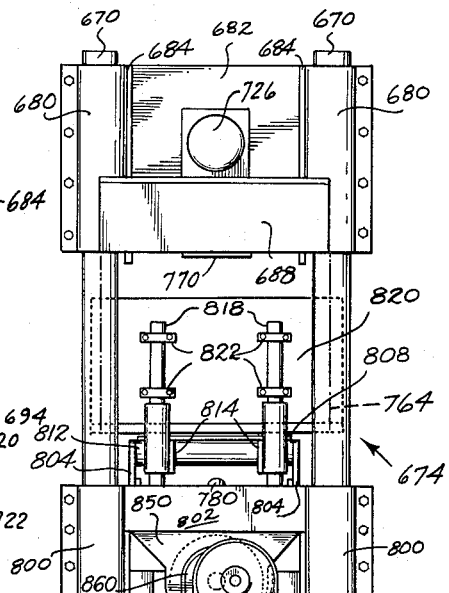
FIG. 2 is a view in side elevation of a trim saw employed in conjunction with the edge press and prepress of the preceding figure.

The saw and deckle assemblies are mounted on a frame which includes upright posts 670 (FIGS. 2, 3). Posts 670 support an upper saw unit 672 illustrated with the saw in retracted, inoperative position, an upper deckle assembly 674 illustrated with the deckles in raised operative position, a lower saw assembly 676 illustrated with the saw in advanced, operative position, and a lower deckle assembly 678 illustrated with the deckles in lowered, inoperative position.

The upper and lower saw assemblies are substantially identical in construction. Each is mounted on a framework including sleeves 680 clamped to posts 670, longitudinal side plates 682, transverse side plates 684, top plate 686, bracket 688, tie plates 690, and angle irons 692. A pair of parallel, horizontal tracks 694 are welded to the inner bottom margins of side plates 684 (FIGS. 6, 7). A pair of parallel horizontal chain guideways 696 are welded to angle irons 692.

Tracks 694 mount a trolley which reciprocates back and forth across the unit and carries the trim saws. The trolley includes a centrally cut-away horizontal plate 700 which carries on its upper surface a pair of spaced blocks 702 and on its under surface cross bars 704, 706 as well as chain guides 708.

Shafts 710 are journaled in bearings 712 mounted on the forward and rearward ends of plate 700 respectively. Grooved wheels 714 are fixed to the ends of the shafts and track on the upper surfaces of tracks 694.

Shafts 716 are journaled in bearings 718 bolted through filler blocks 720 to the underside of plate 700 at the respective ends thereof. Flat wheels 722 are secured to the ends of the shaft and track on the under surfaces of tracks 794. Spaced grooved wheels 724 are fixed to shaft 716 inside bearings 718.

The trolley is driven by motor 726 bolted to frame plate 682 (FIGS. 4, 5). The shaft of the motor is coupled to a gear box 728 to the shafts of which are keyed sprockets 730.

An idler shaft 732 is journaled in bearings 734 at the side of the unit opposite sprockets 730. This shaft carries sprockets 736 which, together with sprockets 730, engage and support a pair of parallel, discontinuous, drive chains 738. The respective ends of these chains carry threaded extensions 740. These extensions on the forward end of the trolley are slidable in openings through cross bar 704 of the trolley frame. The same members on the rear end of the trolley are slidable in openings through cross bar 706 of the trolley frame. Each of the extensions is threaded into a nut 742, which may be adjusted as required to tighten the chains.

The upper stretches of chains 738 are supported by longitudinal chain guides 696. The lower stretches of the chains are supported by the upper surface of parallel, longitudinal bars 744 the ends of which are connected to the frame of the unit. The under surfaces of these bars are received and supported by grooved wheels 724, thus insuring adequate support for the chains.

The saw unit which depends from the above described trolley is supported in part from a block 750 affixed to the under side of plate 700 and extending downwardly therefrom. A sleeve 752 is rigidly affixed to the lower end of this block. A shaft 754 is journaled in the sleeve.

The inner ends of a pair of spaced side plates 756 are fixed to the respective ends of shaft 754. An end plate 758 spans and is connected to the two side plates, forming a housing for the saw drive.

The outer ends of side plates 756 mount bearings 760 in which is journaled a shaft 762 (FIG. 2). Circular saws 764 are fixed to the outer ends of this shaft, and spaced pulleys 766 are keyed to the intermediate portion thereof inside of bearings 760.

Saws 764 are driven from a motor 770 mounted on the saw frame. The shaft 772 of this motor carries pulleys 774 which are connected through belts 776 to pulleys 766 on the saw shaft.

The saws are lowered and raised between operative and inoperative positions by a cylinder 780, the flat base of which is connected to a short, transverse shaft 782. This shaft is journaled in bearings 784 mounted on blocks 702 which in turn are carried on plate 700 of the saw trolley. The piston rod of cylinder 780 is fixed to a shaft 786 which is pivotally mounted in bearings 788 affixed to the saw frame. Accordingly, extension of cylinder 780 lowers saw 764 to the operative position of the lower unit of FIG. 3 while retraction thereof raises the saws to the inoperative position of the upper unit of that figure.

As has been indicated above, the upper and lower decks of the herein described trim saw are provided with deckle plate assemblies 674, 678. These are substantially identical in function and their construction is illustrated particularly in FIGS. 2, 3, 8 and 9.

Thus each deckle unit is mounted on a frame comprising sleeves 800 clamped to posts 670, side plates 802, end plates 804, and cross pieces 806. End plates 804 mount tracks 808 which support the work as it traverses the unit.

The deckle plates are mounted on this frame in such a manner that they may be lifted and retracted until they clear the work completely and lie flat, out of the way of trim saws 764. Accordingly each plate is supported on a rod 810 fixed between side plates 804 (FIGS. 8 and 9). Rotatably mounted on this rod is a hollow, horizontal shaft 812. Rigidly mounted on the latter shaft by means of filler blocks 814 are spaced vertical sleeves 816.

Mounted for longitudinal movement in these sleeves are rods 818 to which deckle plate 820 is connected by means of horizontal brackets 822. The lower edge of the deckle plate is formed with a horizontal foot flange 824 which carries a wear plate 826.

The lower ends of rods 818 mount a horizontal bar 828. The outer ends of the bar carry tabs 830 which support shafts 832 on which cam followers 834 are rotatably mounted. The cam followers work in the slots of cam plates 836 bolted to the inner faces of side frame plates 804. The slots in the cam plates are downwardly arcuate, communicating however, with substantially horizontal recesses at their inner ends.

The deckle plate assembly is driven by means of a cylinder 840, the rear end of which is pivotally connected through pin 842 to bearings 844 carried by the frame of the unit. The piston rod of the cylinder is connected to a short shaft 846 journaled between bearings 848 extending outwardly from the side face of transverse bar 828.

Accordingly, extension of cylinder 840 raises, retracts and lowers the deckle in the manner illustrated by the dotted line positions of FIG. 9, until it rests in a substantially horizontal position, out of the way of the trim saws. Retraction of the cylinder initiates a reverse sequence, and returns the deckle to a vertical position ready to receive the work.

It will be apparent that as trim saws 764 trim off the adjacent edges of leading and following mats, there is formed a quantity of waste material which must be conducted away from the apparatus. The waste material formed by operation of the upper saws is fanned by fans 864 rigid to the saws and guided by plows 866 weld to the frame into conduit 868 which is pivotally connected to the plows by pin 870. Conduit 868 in turn is connected to flexible conduit 872 which conveys the waste by vacuum back to the bin from which the felter is fed.

Any overflow from this collecting system is caught in a trough 850 supported between side plates 804. This trough has downwardly sloping sides and communicates with a spout 852.

An auger 854 mounted on shaft 856 supported by bearings 858 works in the bottom of the trough. Shaft 856 is coupled to the shaft of a gear box 860 which in turn is connected to a motor 862. Accordingly operation of the motor drives auger 854 which carries the trimmed away material out from beneath the unit into downspout 852, whence it may be returned to the source feeding felter 60.

A vacuum collector similar to that used in the upper saw unit, and a trough similar to trough 850 thereof may be provided beneath the lower saw unit or, instead of using a trough the entire apparatus may be mounted over a pit, not illustrated, in which runs a conveyor positioned for receiving the trim. This collector and conveyor also may return the trimmed away material to felter 60.

The basic operation of trim saw 70 is as follows: The mat-caul plate work units are run through the unit with the deckles raised and the foot flanges thereof bearing against the caul plates. When one work unit has been stationed in prepress 68 and another in edge press 66, the pressing members of these presses are operated for consolidating the mats. Before or during the operation, deckle plates 820 of the trim saw are retracted.

Trim saws 764 then are lowered and the trolley carrying them passed back and forth across the work, trimming off the adjacent edges of the mats. The trim from the upper saws falls into trough 850 and is conducted back to felter 60 via spout 852. The trim from the lower saws may be caught in a pit beneath the apparatus and carried back to the felter by a conveyor not illustrated.

The trim saws then are retracted, the deckle plates raised, and the work advanced to the next succeeding stations. The work in the prepress then is advanced to the outfeed jump conveyor 72 which loads it into press loader conveyor 74 preliminary to its final consolidation in a hot press.

*Operation*

The overall operation of the herein described mat handling apparatus is as follows:

Assuming that the infeed jump conveyor 64 is in the elevated position illustrated in FIG. 1, a first work unit which may comprise a lignocellulose mat resting on a metal caul plate is ejected from a high capacity felter 60 and placed on the lower unit of the infeed jump conveyor. There it is located precisely by the operation of impeller 62.

The jump conveyor then is indexed downwardly to its dotted line position and the work unit transferred to edge press 66. While this is occurring a second work unit is ejected from felter 60 onto the upper deck of the jump conveyor.

The jump conveyor then is indexed upwardly until the upper level thereof registers with the upper level of edge press 66 so that the work unit may be transferred thereto. The jump conveyor thus shuttles back and forth between its raised and lowered positions, receiving work units from felter 60 and delivering them alternately to the upper and lower levels of the edge press.

After the first work unit has had its leading edge consolidated in edge press 66, it is transferred to prepress 68. A following work unit thereupon is located on edge press 66. The balance of the first unit is consolidated in the prepress while the leading edge of the following unit is pressed in the edge press. While the two work units are confined in the prepress and edge press respectively, trim saws 70 trim off the trailing edge of the first unit and the leading edge of the following unit.

Outfeed jump conveyor 72 is indexed to its down position and the first work unit drawn into it by means of trolley 1000. While the next work unit is following the first into prepress 68, the outfeed jump conveyor is indexed to its raised full line position whereupon drive sprocket 952 of its lower conveyor level meshes with continuously moving drive sprocket 950 of the press loader conveyor. Thereupon the first work unit is transferred from the outfeed jump conveyor into the press loader conveyor whence it passes to a hot press for final consolidation.

While the foregoing sequence is occurring, a similar sequence is occurring in the upper decks of the various units of the apparatus with the result that the stream of work units emanating from felter 60 is divided into two lines by infeed jump conveyor 64 and, after prepressing and trimming, the two lines are re-united in a single line by outfeed jump conveyor 72 which delivers them to the press loader conveyor.

The sequence thus is repeated continuously to provide a rapid and effective procedure for handling compactable mats. This procedure has the advantages of providing prepressed mats which are self-sustaining and may be handled without danger of breakage in subsequent operations. Furthermore, the leading edges, trailing edges and side edges of the mats all are sharply defined and uniform so that consolidated products made therefrom likewise will have sharply defined uniform edges.

Since a trimming operation is carried out on the mats before their consolidation, the unused trim may be collected and recycled without loss for fabrication into further mats. This is not possible if the mats are trimmed after hot pressing, and effectuates a substantial saving of raw material.

Since the leading edges of the mats are prepressed in an edge press in a preliminary operation, the mats may be introduced into the prepress with little danger of pieces of material working under the caul plates and hence with little danger of denting the latter upon operation of the prepress. Also, the method and apparatus are versatile and adaptable to handling mats of varying length, width and thickness, produced by a felter or other apparatus of high capacity.

It is to be understood that the form of our invention herewith shown and described is to be taken as a preferred example of the same, and that various changes in the shape, size and arrangement of parts may be resorted to without departing from the spirit of our invention or the scope of the subjoined claims.

Having thus described our invention, we claim:

1. In combination with longitudinally spaced mat presses, a traveling saw assembly adapted to trim the spaced pressed trailing edge of a leading mat and the pressed leading edge of a trailing mat and to remove the material between said spaced edges, the saw assembly comprising: track means extending transversely across the mats, trolley means mounted on the track means, drive means connected to the trolley means for reciprocating the latter on the track means, a saw support mounted on the trolley means, spaced saws on the saw support arranged to trim said mat edges adjacent the spaced mat presses, and adjusting means on the trolley means engaging the saw support for raising and lowering the saws relative to the mats and presses.

2. The assembly of claim 1 wherein the saw support is mounted pivotally on the trolley means and the adjusting means comprises an extensible fluid pressure cylinder motor interconnecting the trolley means and saw support.

3. The assembly of claim 1 including means adjacent the saws for conveying away the material removed between the saws.

4. The assembly of claim 3 wherein the conveying means comprises flexible vacuum conduit means supported for movement with the saws and having an inlet end adjacent the saws for carrying away the material removed between the saws.

5. The assembly of claim 4 including fan blades on the saws for directing the removed material toward the inlet end of the vacuum conduit means.

6. The assembly of claim 3 wherein the conveying means comprises an elongated auger conveyor positioned below and parallel to the travel path of the saws.

References Cited in the file of this patent

UNITED STATES PATENTS

| | | |
|---|---|---|
| 1,062,814 | Bernhardt | May 27, 1913 |
| 1,329,634 | Schumacher | Feb. 3, 1920 |
| 1,567,289 | Munroe | Dec. 29, 1925 |
| 1,863,908 | Madsen | June 21, 1932 |
| 1,924,162 | Mason | Aug. 29, 1933 |
| 2,017,535 | Hammer | Oct. 15, 1935 |
| 2,236,232 | Brescka et al. | Mar. 25, 1941 |
| 2,272,215 | Lockett et al. | Feb. 10, 1942 |
| 2,370,932 | Bolling | Mar. 6, 1945 |
| 2,419,751 | Wilson et al. | Apr. 29, 1947 |
| 2,597,678 | Schurman | May 20, 1952 |
| 2,605,841 | Overman | Aug. 5, 1952 |